(12) United States Patent
Buzi et al.

(10) Patent No.: US 11,175,930 B1
(45) Date of Patent: Nov. 16, 2021

(54) DEDUCING A REQUIREMENT TO PRESENT OPTIONAL DATA ENTRY FIELDS BASED ON EXAMINING PAST USER INPUT RECORDS

(71) Applicant: INTUIT INC., Mountain View, CA (US)

(72) Inventors: Larry Buzi, San Diego, CA (US); Michael A. Artamonov, San Diego, CA (US); Jennifer Lynn Keenan, San Diego, CA (US); Kevin McCluskey, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 72 days.

(21) Appl. No.: 15/964,242

(22) Filed: Apr. 27, 2018

(51) Int. Cl.
| | |
|---|---|
| *G06F 9/451* | (2018.01) |
| *G06F 3/0484* | (2013.01) |
| *G06F 16/22* | (2019.01) |
| *G06F 16/23* | (2019.01) |
| *G06F 40/174* | (2020.01) |

(52) U.S. Cl.
CPC ............ *G06F 9/451* (2018.02); *G06F 3/0484* (2013.01); *G06F 16/22* (2019.01); *G06F 16/2379* (2019.01); *G06F 40/174* (2020.01)

(58) Field of Classification Search
CPC ...... G06F 16/22; G06F 9/451; G06F 16/2379; G06F 3/0484; G06F 40/174
USPC .......................................................... 715/704
See application file for complete search history.

(56) References Cited

U.S. PATENT DOCUMENTS

| | | | |
|---|---|---|---|
| 2002/0022986 A1* | 2/2002 | Coker ................... | G06Q 30/02 717/115 |
| 2010/0179962 A1* | 7/2010 | Schuster ............... | G06F 17/243 707/769 |
| 2011/0213784 A1* | 9/2011 | Udupa ................... | G06F 16/30 707/747 |
| 2015/0205777 A1* | 7/2015 | Campanelli ........ | G06K 9/00449 715/226 |

\* cited by examiner

*Primary Examiner* — Kavita Stanley
*Assistant Examiner* — Tionna M Burke
(74) *Attorney, Agent, or Firm* — Patterson + Sheridan, LLP

(57) ABSTRACT

Certain aspects of the present disclosure provide methods and systems for determining that a user has been presented an element in a user interface. In certain embodiments, a certain dataset of past user-inputs may be de-duplicated. The de-duplicated dataset may then be reduced to a set of data structures by identifying all the data fields of the dataset that correspond to questions that were presented to certain users but were not required to be answered.

20 Claims, 9 Drawing Sheets

DATA REPOSITORY 122

DATASET 110

| | A | B | C | D | E | F | G | H |
|---|---|---|---|---|---|---|---|---|
| 1 | N | T | T | F | F | T | T | N |
| 2 | T | T | T | F | F | T | T | N |
| 3 | N | T | T | F | F | T | T | N |
| 4 | T | F | N | T | T | T | T | F |
| 5 | T | F | T | T | T | T | T | F |
| 6 | F | T | T | F | F | T | T | N |
| 7 | F | T | T | F | F | T | T | T |
| 8 | T | F | N | T | T | T | T | F |
| 9 | T | F | F | T | T | T | T | F |
| 10 | T | N | N | T | T | T | T | F |
| 11 | N | T | T | F | F | T | T | N |
| 12 | T | N | T | T | T | T | T | F |
| 13 | T | T | N | F | F | F | T | F |

200

202
PRESENT A USER INTERFACE COMPRISING A PLURALITY OF USER INTERFACE ELEMENTS TO A PLURALITY OF USERS

204
FOR EACH RESPECTIVE USER OF THE PLURALITY OF USERS, RECORD IN ONE OR MORE FIELDS OF A DATA STRUCTURE ASSOCIATED WITH THE RESPECTIVE USER OF THE PLURALITY OF USERS A USER INTERACTION WITH ONE OR MORE OF THE PLURALITY OF USER INTERFACE ELEMENTS, WHEREIN THE DATA STRUCTURE INCLUDES A FIELD FOR EACH USER INTERFACE ELEMENT OF THE PLURALITY OF USER INTERFACE ELEMENTS

206
FOR EACH RESPECTIVE DATA STRUCTURE OF A PLURALITY OF DATA STRUCTURES, DETERMINE A NUMBER OF DATA STRUCTURES IN THE PLURALITY OF DATA STRUCTURES THAT ARE IDENTICAL TO THE RESPECTIVE DATA STRUCTURE AND DELETE THE NUMBER OF DATA STRUCTURES TO FORM A NON-REPEATING SET OF DATA STRUCTURES

208
DETERMINE THAT A USER INTERFACE ELEMENT OF THE PLURALITY OF USER INTERFACE ELEMENTS WAS PRESENTED TO THE PLURALITY OF USERS BY IDENTIFYING A FIRST DATA STRUCTURE AND A SECOND DATA STRUCTURE IN THE NON-REPEATING SET OF DATA STRUCTURES WHEREIN, A HAMMING DISTANCE BETWEEN THE FIRST DATA STRUCTURE AND SECOND DATA STRUCTURE IS 1, A FIRST FIELD IN THE FIRST DATA STRUCTURE IS BLANK, A SECOND FIELD IN THE SECOND DATA STRUCTURE IS NOT BLANK, THE FIRST FIELD CORRESPONDS TO THE SECOND FIELD

FIG. 2

DATA REPOSITORY 122

DATASET 110

| | A | B | C | D | E | F | G | H |
|---|---|---|---|---|---|---|---|---|
| 1 | N | T | T | F | F | T | T | N |
| 2 | T | T | T | F | F | T | T | N |
| 3 | N | T | T | F | F | T | T | N |
| 4 | T | F | N | T | T | T | T | F |
| 5 | T | F | T | T | T | T | T | F |
| 6 | F | T | T | F | F | T | T | N |
| 7 | F | T | F | F | F | T | T | T |
| 8 | T | F | N | T | T | T | T | F |
| 9 | T | F | N | T | T | T | T | F |
| 10 | T | N | N | T | T | T | T | F |
| 11 | N | T | T | F | F | T | T | N |
| 12 | T | N | T | T | F | T | T | F |
| 13 | T | T | N | F | F | F | T | F |

FIG. 3

DATA REPOSITORY(IES) 122

DATASET 120

| | A | B | C | D | E | F | G | H | Count |
|---|---|---|---|---|---|---|---|---|---|
| 1 | N | T | T | F | F | T | T | N | 3 |
| 2 | T | T | T | F | F | T | T | N | 1 |
| 3 | T | F | N | T | T | T | T | F | 2 |
| 4 | T | F | T | T | T | T | T | F | 1 |
| 5 | F | T | T | F | F | T | T | N | 1 |
| 6 | F | T | T | T | F | T | T | T | 1 |
| 7 | T | F | F | T | T | T | T | F | 1 |
| 8 | T | N | N | T | T | T | T | F | 1 |
| 9 | T | N | T | T | T | T | T | F | 1 |
| 10 | T | T | N | F | F | F | T | F | 1 |

DATA REPOSITORY(IES) 122

DATASET 130

| | A | B | C | D | E | F | G | H | Count | Marked for Deletion |
|---|---|---|---|---|---|---|---|---|---|---|
| 1 | N | T | T | F | F | T | T | N | 3 | x |
| 2 | T | T | T | F | F | T | T | N | 1 | x |
| 3 | T | F | N | T | T | T | T | F | 2 | x |
| 4 | F | F | T | F | T | T | T | F | 1 | x |
| 5 | F | T | T | F | F | T | T | N | 1 | x |
| 6 | T | F | F | F | F | T | T | T | 1 | x |
| 7 | N | T | T | F | F | T | T | F | 1 | x |
| 8 | T | T | N | F | F | T | T | N | 1 | x |
| 9 | T | T | F | F | T | F | T | F | 1 | |
| 11 | C | T | T | F | F | T | T | N | 5 | |
| 12 | T | F | C | T | T | T | T | F | 4 | |
| 13 | F | T | T | F | F | T | T | C | 2 | |
| 14 | T | N | C | T | T | T | T | F | 2 | |

DATA REPOSITORY(IES) 122

DATASET 140

| | A | B | C | D | E | F | G | H | Count | Marked for Deletion |
|---|---|---|---|---|---|---|---|---|---|---|
| 1 | N | T | T | F | F | T | T | N | 3 | x |
| 2 | T | T | T | F | F | T | T | N | 1 | x |
| 3 | T | F | N | T | F | T | T | F | 2 | x |
| 4 | T | F | T | F | T | T | T | F | 1 | x |
| 5 | F | T | T | F | F | T | T | N | 1 | x |
| 6 | F | T | F | F | F | T | T | F | 1 | x |
| 7 | T | F | N | T | T | T | T | F | 1 | x |
| 8 | T | N | T | F | T | F | T | F | 1 | x |
| 9 | T | T | N | F | F | T | T | F | 1 |   |
| 10 | C | T | T | T | T | T | T | N | 5 |   |
| 11 | T | F | T | F | T | T | T | F | 4 | x |
| 12 | F | T | T | F | F | T | T | C | 2 |   |
| 13 | T | N | C | T | T | T | T | F | 2 | x |
| 14 | T | C | C | F | T | T | T | F | 6 |   |

DATA REPOSITORY(IES) 122

DATASET 150

| | A | B | C | D | E | F | G | H | Count |
|---|---|---|---|---|---|---|---|---|---|
| 1 | T | T | N | F | F | F | T | F | 1 |
| 2 | C | T | T | F | F | T | T | N | 5 |
| 3 | F | T | T | F | F | T | T | C | 2 |
| 4 | T | C | C | T | T | T | T | F | 6 |

FIG. 7

DEDUCING A REQUIREMENT TO PRESENT OPTIONAL DATA ENTRY FIELDS BASED ON EXAMINING PAST USER INPUT RECORDS

INTRODUCTION

Many software applications require users to input data for a specific purpose. For example, a tax preparation application may require many kinds of information about a person in order to properly calculate that person's taxes. Similarly, a medical application may require many kinds of information about a person in order to provide proper treatment. Other types of applications relating to domains such as investing, lending, bill pay, contracting, accounting, etc., may also require user-input in order to provide the user with the services they require.

Because gathering appropriate and sufficient information from users may be difficult, applications may be designed with graphical user interfaces that ease the data gathering process and improve users' experiences. For example, in the context of tax preparation, an application developer may design a user interface that significantly eases the collection of the requisite information by presenting a series of user interface elements, such as questions, that users may answer, rather than presenting a dense and confounding form to be filled out by users. While the design of such a user interface may aim to significantly improve users' experiences, it may also need to conform with applicable laws, regulations, rules, etc. For example, it may be required that a user is presented with certain questions in the tax context, or in any other context. However, being required to present questions does not necessarily mean the user is required to answer all the presented questions. This confluence of factors leads to an issue for application developers in that user data may not make clear whether a particular user has been presented a particular question if there is no response to that question recorded by the application. In other words, the application developer does not know whether the user was presented with the question and did not answer it, or whether the user was never presented the question. The latter case could lead to significant issues both from a functional standpoint and from a liability standpoint.

This issue is further complicated by the complexity of such data gathering applications. Returning again to the tax context, there may be a substantial amount of unique "paths" through a tax preparation application owing to the amount of unique tax situations possible. Each path may include different sets of questions that are asked, including different sets of questions that must be asked to be compliant with laws, regulations, etc.

Contemporary methods of dealing with these complexities in application, and specifically in user interface design, involve trying to test each path and each user interface element in those paths to determine what is shown to a user and when (or if) it is shown. However, such methods are extremely complex, time consuming, and burdensome, all of which are further exacerbated by the ever present need to revise applications both for improving the user experience and for handling underlying changes to the particular application context, such as changes in laws, regulations, or other complex requirements.

Accordingly, what is needed are methods for determining what user interface elements have been presented to users without testing each individual path through an application interface representing complex and multi-faceted options/requirements.

BRIEF SUMMARY

Certain embodiments provide a method of determining that a user has been presented an element in a user interface. The method includes presenting a user interface comprising a plurality of user interface elements to a plurality of users. The method also includes, for each respective user of the plurality of users: recording in one or more fields of a data structure associated with the respective user of the plurality of users one or more user interactions with one or more of the plurality of user interface elements, wherein the data structure includes a field for each user interface element of the plurality of user interface elements. The method also includes, for each respective data structure of a plurality of data structures: deleting any data structure in the plurality of data structures that is identical to the respective data structure to form a non-repeating set of data structures. The method also includes determining that a user interface element of the plurality of user interface elements was presented to a set of users of the plurality of users by: identifying a first data structure and a second data structure in the non-repeating set of data structures wherein: a Hamming distance between the first data structure and second data structure is 1, a first field in the first data structure is not blank, a second field in the second data structure is blank, and the first field corresponds to the second field.

Also described herein are embodiments of a computer system, wherein software for the computer system is programmed to execute the method described above for determining that a user has been presented an element in a user interface.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example method for determining that a user has been presented an element in a user interface, in accordance with certain embodiments.

FIG. 3 illustrates an example repeating dataset comprising a plurality of user-input rows, in accordance with certain embodiments.

FIG. 4 illustrates an example non-repeating dataset corresponding to a de-duplicated version of the dataset of FIG. 3, in accordance with certain embodiments.

FIG. 5 illustrates an example dataset having a number of additional rows, each having a data field indicating that a corresponding question that has been presented to a corresponding user in a user interface, in accordance with certain embodiments.

FIG. 6 illustrates an example pairing of two of the number of additional rows of the data set of FIG. 5, in accordance with certain embodiments.

FIG. 7 illustrates an example dataset comprising a number of rows indicating whether certain questions were presented to, but not required to be answered by, corresponding users, in accordance with certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
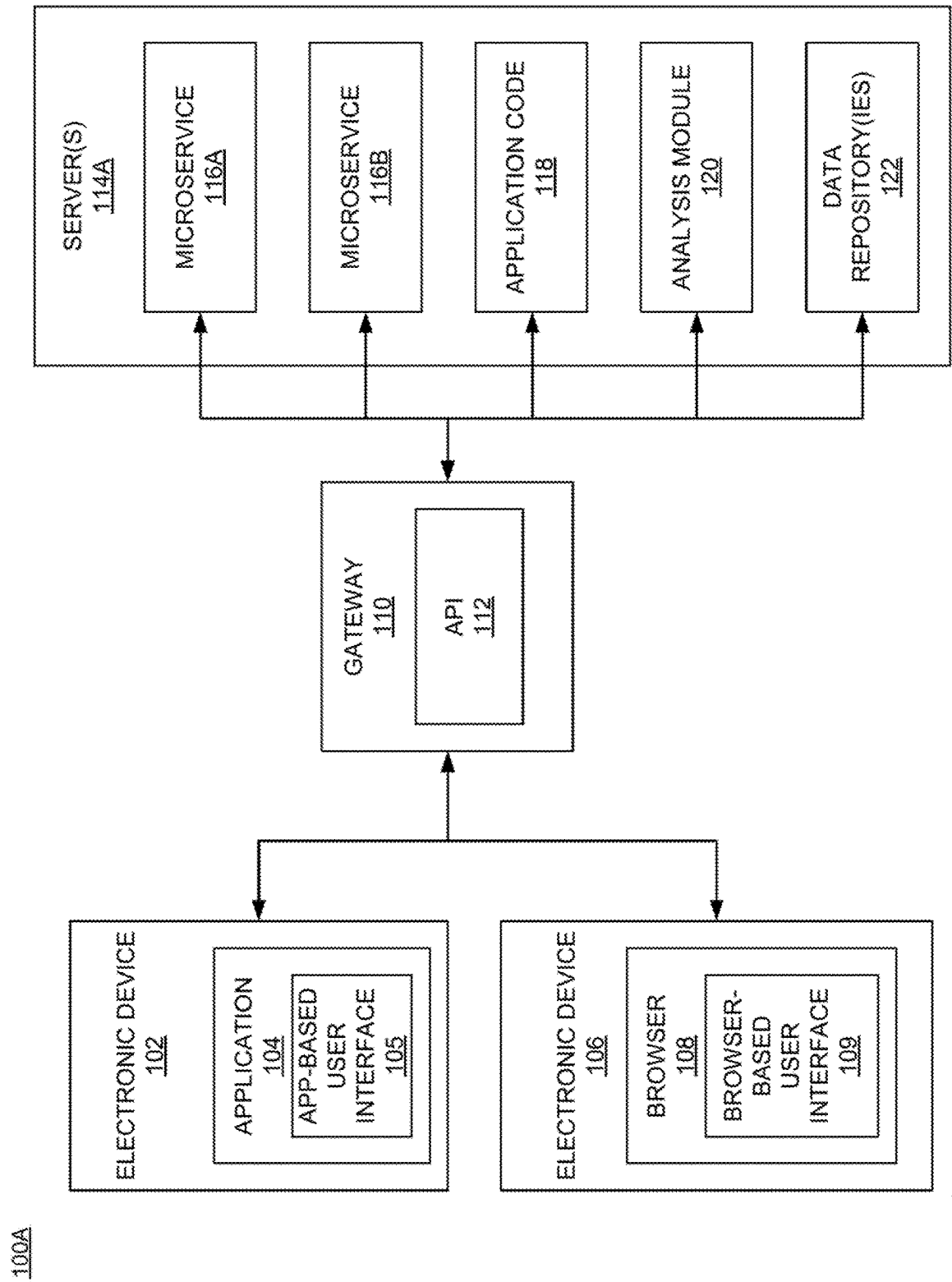
FIG. 1A illustrates an example architecture for providing one or more applications or digital services to a number of users, in accordance with certain embodiments.

Aspects of the present disclosure provide apparatuses, methods, processing systems, and computer readable mediums for determining that a user has been presented an element in a user interface.

The problem of having to manually test application designs to determine, for example, what user interface elements have been presented to a user may be solved by analyzing user data based on interactions with the user interface elements. In this way, the determination may be performed in an automated fashion i.e., without needing to manually test.

For example, by recording user interactions with user interface elements of an application (e.g., user answers to questions presented by the user interface), the "paths" through the application may be represented by data structures indicating which user interface elements each user interacted with. When analyzed appropriately, such data structures may lead to a determination of which user interface elements (e.g., questions) were definitely presented to a user.

Taking a simple example where an application's user interface presents three questions to a user, all of which are required to be presented to the user, but not all of which are required to be answered by a user. If many users interact with the application's user interface and the users' answers are recorded, a pattern may be identified that indicates that each user was indeed presented with each of the three questions. For example, if a first user answered the first two questions, but not the third, an application designer may not know whether or not the third question was properly presented to the user. However, if a second user answered the first two questions in the same way as the first user, and then also answered the third question, the application designer may determine that the third question was presented to the first user and simply not answered because both the first and the second users followed the same path through the application (with respect to the first two questions) and both reached a compliant and accurate outcome despite the different data entries. Though this is a very simple example, this method may be applied to complicated application designs and large user data sets with the same beneficial results.

The benefits of this method are many. First, an application developer may make determinations about the functionality of a user interface in an automated and rapid way, instead of using conventional, manual testing techniques. This frees significant application development resources to focus on further development rather than on testing and validating current development. Second, the application developer may effectively test every path through the application at once, rather than having to test each unique path individually. Third, the application developer may determine user interface malfunctions based on the data alone, instead of having to stumble upon them by manual testing. Fourth, the application developer may more easily prove compliance with applicable laws, regulations, rules, etc., based on data-backed testing results, rather than certifying manual testing.

The following description describes in more detail the application of the aforementioned method and provides examples of the same, further making plain the many benefits and improvements to conventional practices provided by the method.

FIG. 1A illustrates an example enterprise application architecture 100A for providing one or more applications or digital services to users of a number of user devices, such as electronic device 102 and electronic device 106. As shown, electronic device 102 comprises application 104 that, for example, provides digital services to or interacts with the user of electronic device 102 by exchanging information with server 114A by way of gateway 110. The user of electronic device 102 is able to interact with application 104 through application-based user interface 105. Users of electronic devices are also able to interact with the application, provided by server 114A, through a browser. For example, electronic device 106 comprises browser 108 that enables a user of electronic device 106 to interact with the application through browser-based user interface 109 provided by server 114A. In one example, an application (e.g., application 104 a browser-based application provide through browser-based user interface 109) may be an online tax preparation application that gathers necessary information from the users of electronic device 102 and electronic device 106 for completing and filing compliant tax documents for the users. While the example depicted in FIG. 1A includes a single server 114A, microservices 116A and 116B, etc. may be hosted on more than one server in other examples. Also, an application (e.g., application 104) and/or browser (e.g., browser 108) may operate on either or both electronic devices 102 and 106. Electronic device 102 or 106 may be a mobile device, desktop, laptop, thin client, or device with one or more compute resources being located remotely and accessed via a network, etc.

Architecture 100A includes server 114A, which hosts microservice 116A, microservice 116B, analysis module 120, and data repository 122. In some embodiments, an application may be provided to users by server 114A using microservices, such as micro service 116A and microservice 116B. Using microservices, the application may be structured as a collection of coupled services. For example, using microservices, the logic of the application, as well as other functionalities, may be spread over a number of microservices, such that each microservice may, for example, perform a single functionality or execute a single component of the application's logic. Because each of these microservices performs only a part of the logic or stores only a part of the information required to, for example, respond to a user request, the code that processes user requests and displays responses to the users may need to interact with multiple microservices.

Architecture 100A also includes gateway 110, which includes application programming interface (API) 112. API 112 acts as a single point of entry for all clients or users, such as users of electronic device 102 or electronic device 106. For example, API 112 receives requests (e.g., from application 104 or browser 108) and determines what microservices are required to service the requests. In one example, API 112 may route a request to an appropriate microservice that is configured to provide a response to the request. In another example, API 112 may parse the request and route different aspects of the request to different microservices, each of which may provide a certain logic or information required for a response to the request.

In some embodiments, an application (e.g., a browser-based application) may rely on application-specific code (e.g., 118) instead of microservices (e.g., 116A and 116B). For example, application code 118 may contain all of the necessary components and logic required to implement the application.

As shown, server 114A also include data repository 122. Note that while depicted as a single data repository 122, in other examples there may be more than one data repository. Further, a data repository may comprise more than one device. For example, networked storage devices may comprise a distributed data repository. Data repository 122 stores information derived from user interactions with applications (e.g., application 104 or a browser-based application). For example, an online tax preparation application may request certain information from the users during a data gathering process. In some cases, the application may present a digital form to the users that may be filled out by the users to provide the necessary information. In another example, the application may request the necessary information from the users by providing the users with a series of questions. In such an example, the application may present a particular user with a certain question from a bank of questions on a user interface and, based on the answer provided by the user, select the next appropriate question to present to the user, and so on.

As described above, data repository 122 may store user answers to questions that are asked during the data gathering process. In some embodiments, data repository 122 stores only answers of users who completed the data gathering process. In the example where the application is an online tax preparation application, data repository 122 may store answers of each user who completes the data gathering process and files a compliant tax form using the online tax preparation application. In such an example, for each user, data repository 122 may store the user's answers to all the questions that were asked from a user in order to complete a compliant tax document.

In an application that collects data from a user, such as a tax preparation application, certain questions may be required to be presented to and answered by the user (hereinafter referred to as "required questions") while other questions may not be required to be presented to and answered by the user (hereinafter referred to as "not-required questions"). As an example, when a married user's answer to the question: "Are you filing jointly," is yes, then a number of questions about the user's spouse and his/her income etc. may be required to be presented to and answered by the user in order to file a compliant tax document. However, when a married user's answer to the question: "Are you filing jointly," is no, then some or all of the questions that relate to a user's spouse, may not be required to be presented to and answered by the user. As such, for each user, certain questions in the question bank may be required and certain others may be not-required. When a question is a required question, the data gathering requirements to file a compliant document are not complete until an answer to the required question is provided. For example, a user may not be able to skip a required question on a user interface and move to the subsequent question until the user provides an answer to the required question.

In addition to the required and the not-required questions, for each user, certain other questions may be required to be presented to the user but not answered (hereinafter referred to as a "covered question"). For example, once a user indicates that he or she is a homeowner and has a mortgage on the property, in order for the user to file a compliant tax document, the tax preparation application may be required to ask whether the user paid any mortgage points in relation to the mortgage on the property. The question may ask: "Did you pay any mortgage points in relation to the mortgage on your property? If no, you can skip this question. If yes, please select one of the options below: A. 1 point, B. 2 points, C. 3 points etc." Accordingly, this question was required to be presented to the user, but the user did not have to answer it in order for the data gathering requirement to be complete or for the user to file a compliant form. A user's answer to a covered question may not have any impact on what subsequent questions are asked from the user. In addition to the example tax-related application described above, other types of applications relating to domains such as investing, lending, bill pay, contracting, accounting, etc., may also require users to provide input in response to required, not-required and covered questions.

In some embodiments, a user answer may be stored as a "true" (also referred to as 'T'), "false" (also referred to as 'F'), or "null" (also referred to as 'N'). A null value stored in a data field, in some embodiments, may indicate that an answer was not provided by the corresponding user during the data gathering process. A data field comprising a null value is the same as a blank field. A "true" value stored in a data field may indicate that an answer was provided to a corresponding question by the user, in cases where the corresponding question is non-Boolean or does not comprise a conditional expression. For example, a question may ask: "please enter your annual income." This question is a non-Boolean question that does not comprise a conditional expression. In such an example, a user may answer by inputting a certain amount. Accordingly, a value of "true" may be stored in a corresponding data field to indicate that an answer was provided to the corresponding non-Boolean question.

In some other embodiments, a "true" value stored in a data field may indicate a "yes" or "no" or "true" or "false" answer. For example, a Boolean question may ask: "do you have any children?" In such an example, if the user responds by selecting "yes" on the user interface, a value of "true" may be stored in data repository 122 to indicate a "yes" answer by the user. A "false" value stored in a data structure of data repository 122 may indicate a "no" or a "false" answer by the user in response to a Boolean question. For example, a Boolean question may ask: "Do you make more than $100,000? A. False or B. True." In such an example, a "false" value may be stored for a user that selects "A" and a "true" value for a user that selects "B."

In some embodiments, the value stored in a data structure and associated with a user answer may be based on an expression, such as a logical or conditional expression, being applied to the answer after receiving the answer from the user. In other words, the "true" or "false" values may be the result of applying an expression to the answer of a question. For example, rather than asking a user whether his salary is above or below a certain value, a question may only ask a user to enter his salary. In such an example, a value of "true" may be stored in a corresponding data structure if the user's answer is greater than or equal to $100,000. If, on the other hand, the user's answer is below $100,000, then a value of "false" may be stored in the corresponding data structure. In some cases, this question may be referred to as a "pivot" because the result of the answer and the expression may prompt different data collection requirements. For example, additional questions may be necessary for a user with a salary above $100,000, which do not apply to users with a salary below $100,000.

Accordingly, a data structure may store a user's answers in a number of fields corresponding to a number of questions, and each field may store a value of "true" or a value of "false" for questions that were presented to and answered by the user (e.g., Required questions), and a value of "null" for questions that were not presented to the user (e.g., not-required questions) as well as questions that were presented to the user but no answers were required and provided (e.g., covered questions).

As described in relation to FIG. 2, analysis module 120 may be configured to examine and analyze a dataset of past user answers (e.g., aggregate logs of completed and compliant forms), for example, stored in data repository 122 to identify user interface elements in the dataset that were presented to certain users but were not required to be answered.

Figure 1B:
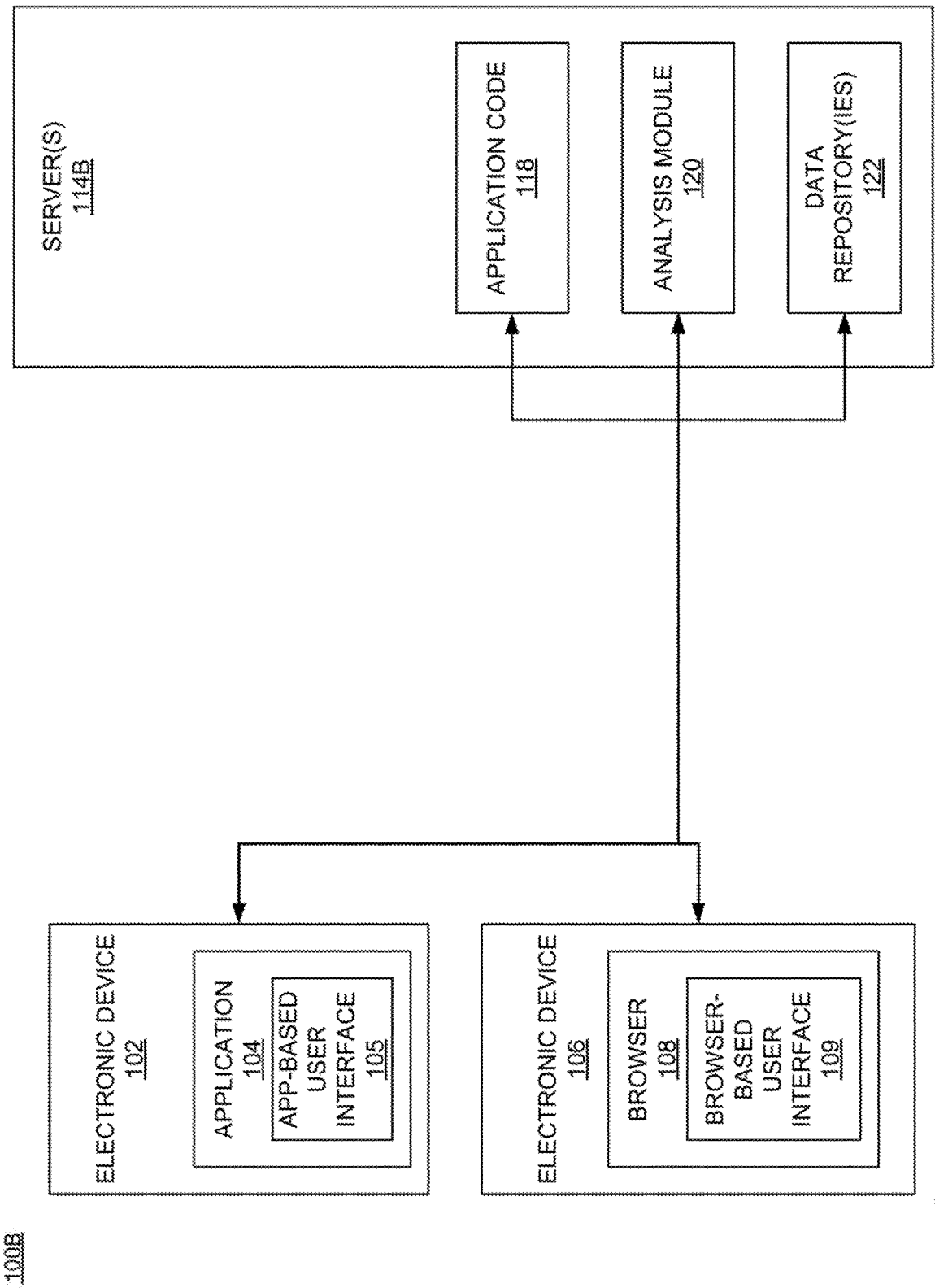
FIG. 1B illustrates an example architecture for providing one or more applications or digital services to a number of users using application code, in accordance with certain embodiments.

Although server 114A, in architecture 100A, comprises both microservices 116A and 116B as well as application code 118, FIG. 1B illustrates architecture 100B including server 114B, which only hosts application code 118 and not any microservices. Server 114B also includes analysis module 120 and data repository 122. Application code 118 may contain all of the necessary components and logic required to implement the application. Accordingly, application code 118 is able to service all requests received from electronic devices 102 and 106. In some embodiments, any combination of microservices and application code may be used to service all requests received from electronic devices 102 and 106

FIG. 2 illustrates an example method for determining that a user has been presented an element (e.g., a question) in a user interface, in accordance with certain embodiments.

At step 202, a user interface comprising a plurality of user interface elements is presented to a plurality of users. As described above, a user interface (e.g., app-based user interface 105 and/or browser-based user interface 109 in FIGS. 1A-1B) may be presented to users through their electronic devices (e.g., electronic device 102 and/or electronic device 106 in FIGS. 1A-1B). The user interface may be used to guide the users through a data gathering process that may include presenting a plurality of user interface elements, with which data may be requested from the users. In one example, the user interface elements may be data fields or questions in a digital form that is presented to a user. In another example, each user interface element may be presented to a user on a separate webpage. In such an example, the user may interact with a user interface element on a current page and proceed to the next page to interact with the next user interface element. For instance, if the user interface element is a question, the user may answer a question on the current page, and once the answer is provided, the next question may be presented to the user on a separate page.

As described above, a user interface having a plurality of user interface elements may be presented to a plurality of users. In other words, a large number of users may utilize the user interface to input data that a corresponding application may use to provide a service to the users. For example, users may interact with a user interface provided by an online tax preparation application to provide data that the application may use to complete and file compliant tax documents for the users. In another example, users may interact with a user interface provided by an application that allows the users to file online immigration applications. Note that the embodiments described herein are not limited to a certain type of application and that these examples are described merely to provide a clearer understanding of the embodiments.

At step 204, for each respective user of the plurality of users, one or more user interactions with one or more of the plurality of user interface elements is recorded (e.g., in data repository 122 of FIGS. 1A-1B) in one or more fields of a data structure associated with the respective user of the plurality of users. User interactions may include, for example, a user answering a question by entering text into a text field, selecting an option in a drop-down menu, selecting a radio-button or tick a box, or any other of the many ways for a user to interact with an application. In some example, a user interaction may be inferred, for example, by a user hovering over (e.g., with the cursor of an input device) a user interface element for a threshold amount of time (or at all) or by clicking on or touching a user interface element.

Each data structure may include a field for each user interface element of the plurality of user interface elements. As described above, in some embodiments, user interface elements may be questions or data fields on a digital form or a webpage, and user interactions may comprise input that the users provide in response to those questions or within those data fields. As above, some or all of the user interactions provided by users are recorded in data structures corresponding to the users. For example, user interactions for each user may be recorded in a corresponding data structure having a plurality of data fields, where each data field may correspond to a different user interface element. Accordingly, for each user, each user interaction may be recorded or stored in a data field of a respective data structure that corresponds to the user interface element for which the user interaction was provided. As described above, in some embodiments, for user interface elements for which some input is provided by the user, the corresponding data fields may store a value that indicates a user interaction or input. For example, a value of "true" or "false" may be stored in such fields.

In some embodiments, a user interaction may also comprise or indicate a lack of response or input by the user. For example, a user may not be presented with a certain question (e.g., a not-required question), in which case no user interaction is provided. In such an example, a corresponding data field may, accordingly, indicate a lack of response. In another example, a user may be presented with a question, but may skip it without answering it (e.g., a covered question). In such an example, a corresponding data field may similarly store a value that indicates a lack of response or input. For example, a value of "null" may indicate a lack of response. In another example, such data fields may be left blank. After recording each user's interactions with the user interface elements in respective data structures, a dataset may result, which may comprise a number of data structures, each corresponding to user interactions of a different user. In embodiments where the data structures are rows and user interface elements are questions, each row in a dataset may correspond to a different user and may comprise a plurality of data fields, each corresponding to a different question. As an example, a row may comprise a hundred data fields, each corresponding to a different question provided by an application. Each data field may store a user input provided for a corresponding question or a "null" value or blank, indicating a lack of response for a corresponding question.

At step 206, for each respective data structure of a plurality of data structures, any data structure in the plurality of data structures that is identical to the respective data structure is deleted to form a non-repeating set of data structures (e.g., by analysis module 120 in FIGS. 1A-1B). As described above, at step 204, a dataset is generated comprising a plurality of data structures, each corresponding to a different user's interactions with user interface elements. In some cases, the dataset may comprise a number of data structures with identical data field values. In such cases, for each data structure, any identical data structures may be identified and deleted from the dataset, resulting in a de-duplicated dataset. For example, in embodiments where the data structures are rows, for each row of the dataset, any rows having identical data field values may be identified and deleted. Examples of duplicate data structures are shown in FIG. 3 and further described below.

De-duplicating the dataset may improve the speed and efficiency of further analysis of the dataset. For example, the active memory requirements for analyzing the de-duplicated dataset may be reduced because they size of the dataset may be significantly reduced via de-duplication. Further, a smaller dataset may be more quickly and efficiently moved across a network connection. Finally, de-duplicating the dataset avoids the processing of duplicate rows thereby saving significant processing resources.

In some embodiments, prior to deleting any duplicate data structures for a certain data structure, a user count including the number of users corresponding to the identical data structure may be stored for the certain data structure. For example, for a data structure in a dataset, the entire data set may be searched and N identical data structures may be identified. Subsequently, in some embodiments, the respective data structure may be tagged with a number N+1. In some embodiments, the number N+1 may be stored in a data field of the respective data structure. N+1 corresponds to the user count associated with the identical data structures (i.e., N) plus the user count of the data field for which the identical fields were identified (i.e., 1). This is so that after deleting identical data structures for a certain data structure, the total number of users corresponding to the certain de-duplicated data structure (i.e., the data structure's user count) may be determined.

For example, in embodiments where the data structures are rows, suppose for a certain row, 12 rows are identified in the dataset that have data fields that are identical to the data fields of the certain row. In such an example, analysis module 120 in FIGS. 1A-1B, may store the number 13 in a data field of the certain respective row to indicate that the certain respect row corresponds to answers provided by 13 users. Analysis module 120 may then delete the 12 duplicate rows. In some embodiments, instead of tagging the respective row or storing a number in a data field of the respective row, analysis module 120 in FIGS. 1A-1B may merely keep track of the number of users whose answers correspond to a certain row.

At step 208, it is determined (e.g., by analysis module 120 in FIGS. 1A-1B) that a user interface element of the plurality of user interface elements was presented to a set of users of the plurality of users by identifying groups of data structures (e.g., a first data structure and a second data structure) in the non-repeating set of data structures wherein certain conditions are true. For example, a first condition may be that an editing distance, such as a Hamming distance, between the first data structure (e.g., a row, as described below in relation to FIGS. 3-8) and second data structure is 1. A Hamming distance between two data structures indicates the number of corresponding data field pairs whose values are different. Accordingly, a Hamming distance of 1 between two data structures indicates that data fields in only one corresponding data field pair comprise different values (i.e., are different). In some embodiments, other Hamming distances (e.g., Hamming distance of 2 or 3, etc.) may be used. In some embodiments, a Hamming distance may be calculated using the formula below:

$$d^{HAD}(i, j) = \sum_{k=0}^{n-1} [y_{j,k} \neq y_{j,k}]$$

In the equation above, $d^{HAD}$ is the Hamming distance between the objects i (e.g., data structure) and j, k is the index of the respective variable reading y out of the total number of variables n. The Hamming distance refers to the number of mismatches between the variables paired by k. In some embodiments, other editing distances (e.g., algorithmic n-gram distances, Levenshtein distances, etc.) may be used instead of a Hamming distance.

A second condition is that a first field in the first data structure is not blank. In the context of method 200, this condition ensures that for the particular data field, at least one user has interacted with a user interface element (e.g., answered a question) associated with that data field. A third condition is that a second field in the second data structure is blank, which means that at least one other user did not interact with the user interface element (e.g., did not answer the question). A fourth condition is that the first field corresponds to the second field.

When all of these conditions are met, it is possible to conclude that a user interface element was presented to a set of users even when not all users in the set interacted with the user interface element. Accordingly, it may be determined that the user interface element was presented to the users of those data structures, but interacting with the user interface element was not required, resulting in some users interacting with the user interface element and some users not interacting with it. In other words, in embodiments where the user interface elements are questions, the user interface element or question may be determined to be a covered question. The analysis of whether a user interface element (e.g., a question) is a covered element (e.g., a covered question) can be done without considering or seeking to understand the text, intent, or meaning of the user interface element.

After de-duplicating the dataset in step 206, as described above, for each data structure of the dataset, the dataset may be searched and all the data structures (i.e., may be zero or more) with a Hamming distance of '1' with the respective data structure may be identified such that the data fields that comprise different values correspond to each other (i.e., correspond to the same user interface element), at least one of the data fields comprises a "null" value, and at least another one of the data fields comprises a non-bank or non-null value (e.g., "true" or "false" or some other value that indicates a user answer, such as '1,' or '2,'). Examples of such data structures are shown in FIG. 4 and further described below. Note that the fields that store data structures' user counts, as described above, are not considered when performing the analysis described in step 208 (i.e., such data fields are not included in the calculation of Hamming distances between data structures).

After, for a certain data structure, the dataset is searched and one or more data structures with a Hamming distance of 1 are identified that also meet the other conditions described above (i.e., (2) data fields that comprise different values correspond to each other, (3) at least one of the data fields comprises a "null" value or blank and (4) at least another one of the data fields comprises a non-bank or non-null value.), in some embodiments, the certain data structure and the one or more data structures that are identified may be marked for deletion, but not immediately deleted. Thereafter, an additional data structure may be generated and added to the dataset, the additional data structure having a Hamming distance of I' with the certain data structure and the one or more data structures. The additional data structure may include a data field, corresponding to the differing data fields, indicating that the corresponding user interface element was presented to the users whose interactions are stored in the certain data structure and the one or more identified data structures. In some embodiments, the field may contain a value of 'C' to indicate that the field corresponds to a covered question. In some embodiments, the additional data structure may also comprise a data field that stores a count equal to the aggregate of all the user counts of the certain data structure and the one or more data structures. An example of this is illustrated in FIG. 5.

In some embodiments, as described below in relation to FIG. 4, when pairing data structures together, that meet the conditions above, the user count associated with each of the data structures may be considered to determine if the data structure with a differing field that comprises a null value is an erroneous data structure and should be deleted. In such embodiments, if the data structure is determined to be erroneous, no determination about whether the differing data fields correspond to a user interface element that has been presented to the user can be made and the erroneous data structure is deleted from the dataset.

In some embodiments, this analysis is performed for each data structure of the de-duplicated or non-repeating dataset, except for the additional data structures that are generated and added to the dataset during the same pass or round of the analysis. In other words, for each data structure in the dataset, except for the additional data structures that are generated and added to the dataset, the dataset is searched to identify one or more data structures with a Hamming distance of '1' that meet the other conditions described above. Once this first round of analysis is performed for all the initial data structures (i.e., not including the additional data structures that were added during the first round) in the dataset, a second round of analysis begins for all the data structures in the new dataset, including the additional data structures that were generated an added during the first round. The subsequent or second round of the analysis is performed because an additional data structure that is generated during the first round of the analysis may pair or match with another additional data structure that is generated during the first round of the analysis.

During the second round of the analysis, for each data structure in the dataset (including the additional data structures that were added to the dataset during the first round but not the additional data structures that are added during the second round), the dataset is searched to identify one or more data structures with a Hamming distance of 1 that meet the conditions described above. If any pairing is performed during the second round, additional data structures are added, as described above, and a third round of analysis may be performed. Subsequent rounds of analysis may be performed until no additional pairings are possible during the last round, in which case, no additional rounds of analysis are performed and the process ends. For example, if no pairing is performed during the second round, the second round's analysis may be performed for all the data structures (including the additional data structures that were added during the first round) and end. As described below in relation to FIG. 7, some embodiments, after the last round of the analysis ends, there may be a number of data structures, comprising data fields with null values, which did not pair with any other data structures. In such embodiments, for each of such data fields in each of the non-paired data structures, an analysis may be performed to calculate a probability that a user interface elements corresponding to each of such data fields were presented to the corresponding users.

After the process ends (i.e., the last round of the analysis), in some embodiments, all the data structures that are marked for deletion, are deleted. Accordingly, using this method, the non-repeating dataset can be reduced from a large number of data structures to a decreased number of data structures that may correspond to a set of real representations of the data gathering requirements, as described further in relation to FIG. 5. The reduction of a large repeating dataset to a non-repeating dataset and further to a reduced number of data structures is illustrated with examples provided by FIGS. 3-7.

FIG. 3 illustrates an example dataset 110, which may be representative of user interactions with user interface elements of an application. As depicted in this example, dataset 110 may be stored in data repository 122 of FIGS. 1A-1B.

In the example depicted in FIG. 3, dataset 110 comprises thirteen rows, which correspond to the interactions of thirteen users with an application (e.g., corresponding to users' answers to questions presented by the application). Each of the 13 rows stores a single user's answers (i.e., user interactions or input) or lack thereof to 8 questions. For example, row '1' comprises 8 data fields that store User 1's answers to questions A-H.

Dataset 110 also includes eight columns (A-H), each of which corresponds to a specific interface element (e.g., a specific question) that may be presented to a user by the application during a data gathering process. For example, the user interface elements corresponding to columns A-H may be questions asked to one or more users of a tax preparation application.

The data fields at the intersection of each row and column store values that indicate a specific user's interaction (or lack of interaction) with a specific user interface element. For example, a data field may include a "true" or "false" value indicating that the user interacted with a user interface element, such as by answering a corresponding question. As described above, in some embodiments, a "true" value may indicate that an answer was provided in the case of a non-Boolean question or a "true" in the case of a Boolean question. Also, a "false" answer may indicate a "false" in the case of a Boolean question. A "null" value or a blank data field indicates a lack of response or interaction, such as when a user does not provide any input or skips a question. Note that the use of these values is merely exemplary and that any other values that provide the same indications may be used. For example, the number '1' may be used instead of "true," the number '2' may be used instead of "false," and the number '0' may be used instead of "null."

In this example, dataset 110 includes duplicate rows. For example, rows 1, 3, and 11 comprise identical data field values. In other words, User 1's answers, stored in row 1, are identical to User 3's and User 11's, stored in rows 3 and 11 respectively. Rows 4 and 8 also comprise identical data field values. As described above, dataset 110 may be reduced to a set of unique rows that are nevertheless a complete representation of the interactions of all the users with the application.

As described above, in relation to step 204 of FIG. 2, it is more efficient to analyze a de-duplicated dataset. Thus, dataset 110 may be de-duplicated prior to performing additional analysis on dataset 110. The process of de-duplicating dataset 110 may be iterative. For example, starting with row 1, dataset 110 is searched to identify any rows identical to row 1, which in this case results in identifying duplicate rows 3 and 11. Rows 3 and 11 are then deleted from dataset 110. As described above, in some embodiments, prior to deleting rows 3 and 11, a number of identical rows may be determined (e.g., by analysis module 120 in FIGS. 1A-1B), which is two in this example (corresponding to rows 3 and 11). Thus, the total number of rows with the same information as row 1 (i.e., prior to de-duplication) is three, including rows 1, 3, and 11. Thus number '3' may be stored in another field of row 1 (such as shown in FIG. 4) so that the dataset may be compacted without losing the information.

The de-duplication process may continue iteratively (e.g., row-by-row) such that it identifies additional duplicate rows 4 and 8. Then the de-duplication method may proceed as described above.

FIG. 4 illustrates a non-repeating dataset 120, which is a de-duplicated version of dataset 110 of FIG. 3. As described above, a count is stored in a data field of each unique row that represents the total number of rows (i.e., users) whose answers correspond to that row. For example, row 1 has a count of three, which corresponds to the original row 1, row 3, and row 11 of dataset 110. For the same reason, row 4 has a count of two, which corresponds to rows 4 and 8 of dataset 110.

After de-duplicating dataset 110 to generate dataset 120, step 208 of method 200 may be performed to identify user interface elements that were presented to users but did not need to be answered. Accordingly, as described in step 208 of method 200, for each respective row of dataset 120, all the rows in dataset 120 may be identified where the following conditions are true: (1) a Hamming distance of 1 between the rows (i.e., the rows are identical in all data fields or columns, except one); (2) at least one of the differing data fields comprises a "null" value; (3) at least another one of the differing data fields comprises a non-blank or non-null value (e.g., "true" or "false"), and (4) that the differing data fields correspond to each other.

For example, the analysis may start with row 1 of dataset 120 and search dataset 120 to identify all the rows with a Hamming distance of 1 from row '1'. As shown, rows 2 and 5 (identified with the same shading) both have a Hamming distance of 1 from row 1 (i.e., only one data field in each of rows 2 and 5 has a value that differs from a data field in row 1). In addition, the differing data fields among row 1, 2, and 5, are all the rows' first data fields, thereby, corresponding to each other or the same question, question A. For example, the first data field of row 1 (i.e., data field in row 1, column A, with a value of N or null) differs from the first data field of row 2 (i.e., data field in row 2, column A, with a value of T or true) and the first data field of row 5 (i.e., data field in row 5, column A, with a value of F or false).

Moreover, the differing data fields of rows 1, 2, and 5 comprise at least one "null" (i.e., row 1, column A) and one 'non-null' value (i.e., row 2, column A and row 5, column A). Having identified rows 2 and 5, using the conditions described above, analysis module 120 may determine that for rows 1, 2, and 5, question A was a covered question. In other words, question A must have been presented to the users of rows 1, 2, and 5, but the question was not required to be answered. Accordingly, the users of row 1 did not answer the question while the users of rows 2 and 5 did. If question A was a required question, then the users of row 1 would not have been able to skip it. If question A was a not-required question, then it would not have been presented to any of the users of rows 1, 2, and 5 and, therefore, users of rows 2 and 5 should not have been able to answer it. As such, analysis module 120 is able to determine that question A was a covered question for the users of rows 1, 2, and 5.

In some embodiments, the user counts associated with the rows that meet the grouping conditions described above (e.g., rows 1, 2, and 5) are considered when determining whether the differing data fields (e.g., first data fields of rows 1, 2, and 5) in the paired rows correspond to a covered question. More specifically, if a differing data field of a row of a group of paired rows comprises a non-null value and the user count corresponding to the row is much larger than a user count corresponding to another row in the group of paired rows whose differing data field comprises a null value, then the row with the lower user count may have been introduced into the dataset erroneously.

For example, suppose the user count associated with row 2 is 3,000 (instead of 1, as shown in FIG. 4), meaning that 3,000 users provided answers to questions A-H that match the values stored in the data fields of row 2. Further suppose that the user count associated with row 5 is 2,000 (instead of 1, as shown in FIG. 4) while the user account associated with row 1, is 3, as shown. In such an example, determining that question A was a covered question for the users of rows 1, 2, and 5 may be incorrect. This is because, generally, when a question is presented to a group of users and answering the question is optional (i.e., a covered question), a large portion of the users (e.g., more than half) may skip the question or provide no input. In the example of FIG. 4, row 1 comprises a null value in its first field and the user count corresponding to row 1 is 3. In other words, if question A was a covered or optional question, then the data shows that only 3 users skipped the question while 3,000 users provided answers that were recorded as "true" (i.e., per row 2) and 2,000 users provided answers that were recorded as "false" (i.e., per row 5). However, it is very unlikely that so many more users would answer an optional question instead of skipping it. As a result, in these cases, the low-count row for the "null" value rows may indicate errors in the dataset. In the example above, row 1 may be determined to be an erroneous row and may be deleted from the dataset.

In some embodiments, a threshold may be used for determining whether the user count associated with the row that has the null value is, in fact, small enough in comparison to the user count(s) of the other one or more rows in the paired group. For example, the user count associated with the row(s) having a non-null or non-blank value may be divided by the user count associated with the row having a null value and determine that the row having the null value is erroneous if the result of the division is higher than a certain threshold number. Continuing with the example above, the user count associated with rows 2 and 5 (i.e., 2,000+3,000=5,000) is divided by the user count associated with row 1 (i.e., 3), which results in 1,666.66 (5,000/3). If the threshold number, for example, is defined as 1,000 in this example, then row 1 is determined to be erroneous and may be deleted from the dataset.

In the example of FIG. 4, however, the user counts associated with rows 2 and 5 are not much larger than the user count associated with row 1. As a result, row 1 is not determined to be erroneous and, therefore, a determination can be made that question A is a covered question for rows 1, 2, and 5. Once a determination is made that question A is a covered question for rows 1, 2, and 5, analysis module 120 may mark rows 1, 2, and 5 for deletion, although they are not deleted until no other pairings between any other rows are possible. Moreover, a new row may be generated (i.e., row 11 in dataset 130 of FIG. 5) having a first field that indicates a covered question and a set of remaining fields that are identical to the remaining fields of rows 1, 2, and 5.

Having performed step 208 of method 200 for row 1, row 2 of dataset 120 may be analyzed. For row 2, no new pairings (e.g., pairings other than with row 1 and 5) are identified.

Next, row 3 is analyzed and rows 4 and 7 are determined to meet the conditions described above. Using the same method as described above, the third fields (i.e., fields C) of rows 3, 4, and 7 are determined to correspond to a covered question. In other words, question C are identified as a covered question for the users of rows 3, 4, and 7. As such, rows 3, 4, and 7 are marked for deletion and generates an additional row (i.e., row 12 in dataset 130 of FIG. 5) having a field C that indicates a covered question and a set of remaining fields that are identical to the remaining fields of rows 3, 4, and 7.

Next, row 4 is analyzed, but no new parings (e.g., pairings other than with row 3 and 7) are determined so the analysis moves to row 5.

For row 5, a new pairing with row 6 is identified that meets the conditions discussed above. More specifically, it is determined that question H was a covered question for the users of rows 5 and 6. Accordingly, row 6 is marked for deletion (row 5 is already marked for deletion) and a new row is generated (i.e., row 13 in dataset 130 of FIG. 5) having a data field 'H' that indicates a covered question and a set of remaining fields that are identical to the remaining fields of rows 5 and 6.

Next, rows 6 and 7 are determined to have no additional rows matching the conditions described above.

Next, row 8 is analyzed and row 9 is identified as a row that meets the conditions described above. Rows 8 and 9 are then marked for deletion and a new row is generated (i.e., row 14 in dataset 130 of FIG. 5) having a field C that indicates a covered question and a set of remaining fields that are identical to the remaining fields of rows 8 and 9.

Next row 10 is analyzed and no pairings for row 10 are determined. Thus ends the first pass or round of the analysis of dataset 120 according to the method described with respect to FIG. 2.

FIG. 5 illustrates dataset 130, which includes rows 140 that were generated and added to dataset 120. As described above, row 11 was generated as a result of the analysis performed in relation to rows 1, 2, and 5, as described above. Row 11 has a Hamming distance of 1 from rows 1, 2, and 5, and includes a field A that indicates a covered question and a set of remaining fields that are identical to the remaining fields of rows 1, 2, and 5. Also, row 12 was generated as a result of the analysis performed in relation to rows 3, 4, and 7 while row 13 was generated as a result of the analysis performed in relation to rows 5 and 6. Lastly, row 14 was generated as a result of the analysis performed in relation to rows 8 and 9.

In some embodiments, as shown in FIG. 5, when an additional row is generated, a user count is stored in one of its data fields to indicate the total number of users whose answers correspond to the additional row. For example, row 11 comprises a data field that stores a user count of 5, which equals the sum of the user counts of row 1 (i.e., 3), row 2 (i.e., 1), and row 5 (i.e., 1).

As described above, once this first round of analysis is performed for all the initial rows (e.g., rows 1-10) in the dataset (e.g., dataset 120), a second round of analysis begins for all the rows (e.g., rows 1-14) in the new dataset (e.g., dataset 130), which includes the additional rows that were generated an added during the first round of analysis. Accordingly, in the example of FIG. 5, a second round of analysis is performed for all the rows of dataset 130. In such an example, the analysis may start from the first row and search dataset 130 to identify any new pairings for row 1 that meets the conditions described above. In this example, there are no new pairings for row 1 (because rows 2, 5, and 10 are not new pairings), so the analysis moves to the next rows and, upon determining that no new pairings are also found for rows 2-10, the analysis then moves to row 12. For row 12, row 14 is identified, which meets the required conditions discussed above, i.e., it has a Hamming distance of 1 from row 12, the rows' differing data fields (second data fields of rows 12 and 14) correspond to each other and one of the differing data fields (i.e., second data field of row 14) has a null value and the other differing data field (i.e., second data field of row 12) has a non-null value.

FIG. 6 illustrates pairing rows 12 and 14, which results in the addition of row 15. After creating row 15, rows 12 and 14 are marked for deletion. Row 15 has a Hamming distance of 1 with rows 12 and 14 and comprises a 'B' field and a 'C' field that indicate covered questions.

The analysis continues for the remaining rows and no new pairings are found.

Because a new row was added in the last (second) round of analysis, a third round of analysis is undertaken. In the example of FIG. 6, during the third round of the analysis no new pairings are identified for any of the rows in dataset 140. Thus, the iterative search for covered questions ends. Further, in some embodiments, the rows previously marked for deletion may now be deleted.

FIG. 7 illustrates a dataset 150, which comprises 4 rows. Row 1 corresponds to row 10 of datasets 120-140, for which no pairings were found during any of the first to third rounds of the analysis. Further, row 2 of dataset 150 corresponds to row 11 of dataset 140, row 3 corresponds to row 13, and row 4 corresponds to row 15. As such, rows 1-9 and 12-13 have been deleted.

As described above, no pairings were found for row 1 of dataset 150 (i.e., row 10 of datasets 120-140 or row 1 of dataset 150) during any rounds of the analysis performed by analysis module 120. However, this does not necessarily mean that the third data field of the row, that comprises a null value in column C, does not correspond to a covered question. In other words, just because no pairings are found for certain rows, it cannot be concluded absolutely that one or more of them does not include data fields that correspond to covered questions. This is because the distribution of user-input sequences (i.e., user scenarios) has a very long tail. For example, a hypothetical non-trivial form may have a set of 50 questions, some of which are optional (i.e., covered). If a million people complete such a form, after deduplication, there may be 1,000 different rows recorded for the different user-input sequences (i.e., combinations of "true," "false," and "null" for the various columns or fields). The most common of the rows may correspond to 100,000 users, followed by a quick drop for subsequent rows, such that 500 of the 1000 combinations might correspond to only 1 or 2 users each. This results in many low-count rows not being paired with any other rows, because the user-input sequence they correspond to is so unique. As a result, if a given data field of a given low-count row is blank, and the row does not pair with any other rows to turn the null value in the field into a covered, it cannot be concluded with certainty that the data field, in fact, does not correspond to a covered question.

Accordingly, in some embodiments, when reaching the last round of the analysis, instead of deleting all the rows that were previously marked for deletion and ending the analysis, the analysis may continue to determine if any of the rows, for which no pairings have been found, contains a data field with a null value that may correspond to a covered question.

For example, as described above, row 1 of dataset 150 in FIG. 7, has not been paired with any other rows to indicate that column 'C' (i.e., the third data field of the row), which comprises a null value, corresponds to a covered question. In such an example, a probability of question C being a covered question may be calculated for row 1. Based on that probability, it may determined that question C is or is not a covered question for row 1. In some embodiments, in order to calculate such a probability, other data fields in the same row may be analyzed.

For example, the probability that question C is a covered question (i.e., C=covered) for row 1, given the answer provided to question A for that row or user-input sequence is "true" (i.e., A=T), may be determined. To calculate such a probability, the user-count of each instance of column C turning from blank into covered when the data field in column A of the corresponding row was true (i.e., A is true) may be tracked, and each instance of column C not turning from blank into covered when A is true (except for row 1 of dataset 150 itself) based on the previous rounds of analysis (e.g., first pass or round of the analysis) may be kept track of. For example, analysis module 120 may have a record of 3 users (i.e., user count of 3), for whom column C turned from blank into covered when A was "true." Referring back to FIG. 4, these instances include row 3 and row 8 of dataset 120.

Accordingly, the probability of column C turning from blank to covered, given A is "true," is calculated by adding the user counts of all rows where column C turned from blank into covered when A was true and dividing that number by the sum of the user counts of all the rows where column C turned from blank to covered given A was "true" plus the user counts of all the rows where column C did not turn from blank to covered given A was "true." In the example of datasets 110-150, there is no instance of a row where column C did not turn from blank to covered given A was true. Accordingly, the probability of question C being a covered question for row 1 of dataset 150 is calculated as 100% (i.e., 3/3). If there were instances of rows where column C did not turn from blank to covered given A was true, then the probability would be lower.

In addition to column A (i.e., the first data field) of row 1 of dataset 150, the probabilities for the other columns in the row may be calculated as well. For example, the probability that question C is a covered question for row 1, given the answer provided to question B for that row is "true" (i.e., B=T) may be calculated, the probability that question C is a covered question for row 1, given the answer provided to question D for that row is "false" (i.e., D=F) may be calculated, the probability that question C is a covered question for row 1, given the answer provided to question E for that row is "false" (i.e., E=F) may be calculated, the probability that question C is a covered question for row 1, given the answer provided to question F for that row is "false" (i.e., F=F) may be calculated, the probability that question C is a covered question for row 1, given the answer provided to question G for that row is "true" (i.e., G=T) may be calculated, and the probability that question C is a covered question for row 1, given the answer provided to question H for that row is "false" (i.e., H=F) may be calculated.

Having calculated probabilities for each data field of the row (except for the third data field corresponding to column C), in some embodiments, it may be determined whether question C for row 1 of dataset 150 was a covered question (i.e., whether the blank in the third data field of row 1 of dataset 150 should be turned into covered), based on the probabilities calculated for the other fields of the same row. In some embodiments, a determination may be made based on the probability that is furthest from 50% (i.e., the least equivocal). A probability that is closer to 0 or 1 is a less equivocal probability than a probability that is closer to 0.5 or 50%.

To illustrate this with an example, suppose the probabilities calculated for the other columns or data fields of row 1 of dataset 150 include: 1 (probability of C going from blank to covered, given A=T), 0.2 (probability of C going from blank to covered, given B=T), 0.9 (probability of C going from blank to covered, given D=F), 0.3 (probability of C going from blank to covered, given E=F), 0.1 (probability of C going from blank to covered, given F=F), 0.2 (probability of C going from blank to covered, given G=T), and 1 (probability of C going from blank to covered, given G=F). In such an example, the least equivocal probability is 1, corresponding to the probability of C going from blank to covered, given A=T. Based on that probability, it may determined that question C for row 1 of dataset 150 was a covered question. In some embodiments, a value may then be stored (e.g., C) to indicate a covered question in the third data field of row 1.

In some embodiments, a threshold range from 0.5 may be set in order for to determine that question C for row 1 of dataset 150 was a covered question, and the least equivocal probability may need to be outside of that threshold. For example, a threshold of 0.2 (from 0.5) may be set such that if the least equivocal probability out of all the data fields' probabilities is within the 0.3 to 0.7 range, it may not be determined that, for example, question C for row 1 of dataset 150 was a covered question. A similar analysis may be performed for any other rows for which no pairings were found.

As a result of the analysis performed, and described in relation to FIGS. 2-7, all the covered questions are identified, thereby, allowing an application developer to determine whether such questions were presented to certain users, who did not provide answers to the questions. Therefore, compliance with applicable laws, regulations, rules, etc., can easily be proved using this automated and rapid way of determining whether certain questions were presented to certain users, without having to use manual testing techniques.

Deducing Data Gathering Requirements for Future Users

In addition to ensuring that certain questions were presented to certain users, for example, for compliance reasons, the analysis above may also be used to deduce data gathering requirements for future users of an application. The need to deduce the data gathering requirements becomes critical when the starting points of various users in the data gathering process differ based on existing information that might be available for each user.

As an example, when guiding users through a data gathering process, historically, the starting point of every user in the data gathering process may have been the same. For example, every user would start with a certain first question and, depending on the answer provided to that question, the next question may have been selected and followed. However, as information relating to individuals or users becomes available from more sources, in some cases, the application may receive or store information about certain users from those sources in advance of a user using a particular application for which the data is also relevant. The information received about such users may help answer some of the questions that are required to be asked from those users in order to meet the data gathering requirements (e.g., in order to file a compliant form).

In such cases, it is not efficient for the application to require such users to answer questions for which answers are already available based on the existing information received or stored about those users. For example, if an online tax preparation application (e.g., application 104 in FIGS. 1A-1B) has received information about a user's age, marital status, residence, etc., an improved user experience can be provided to the user if questions about the user's age, marital status, and residence are not asked to the user and, instead, only questions that relate to the remaining information, (i.e., information that the application does not possess about the user) required to meet the data gathering requirements, are presented to the user.

However, because information that is received or stored for each user may be different or answer different questions about each user, the starting point of the data gathering process for each user may be different. As an example, for one user, information about the user's age, marital status, and residence may be available while, for another user, information about the user's income and number of dependents may be available. As one might expect, the starting points of these two users with respect to the data gathering process may be entirely different. In cases where the online tax preparation application is hard-coded with a certain question selection logic for starting each user from starting point in the data gathering process, the application may be rendered unable to determine what set of remaining information still needs to be collected for each user with a different starting point.

The embodiments described in relation to FIGS. 2-7, however, enable an application to determine what set of information is required to be collected from any future user for any starting point in the data gathering process. This is achieved by reducing a dataset of past user input records (e.g., dataset 110 in FIGS. 1A-1B) to a set of real representations of the data gathering requirements (i.e., rows of dataset 150 in FIG. 7, corresponding to all the different and unique user-input or ways the data gathering requirements may be fulfilled for filing a compliant document). More specifically, a real representation of the data gathering requirements is a data structure or a row that identifies which questions are required questions, which questions are not-required questions, and which questions are covered questions. As a result, if there is some existing information available about a certain user that is starting the data gathering process, the application may try to find a row that matches the user's existing information and determine what set of information still needs to be collected from the user by examining the remaining data fields of the row.

The example described below illustrates why the reduction of a dataset of past user input records (e.g., dataset 110 of FIG. 3) into a set of real representations of the data gathering requirements enables an application to more accurately determine what set of information is required to be collected from any future user for any starting point.

Suppose, a user uses an application (e.g., application 104) to provide some necessary information to complete and file a compliant tax form. Further, suppose there are 8 questions, questions A-H, in a bank of questions that may be presented to the user in order to obtain the necessary information. In one example, there may be some existing information about the user that already provides an answer to questions B, C and D, and suppose those answers are T, T, and F. In such an example, if the application examines dataset 110, the application may find a match for the user's existing information in row 1. But by examining the other data fields (i.e., corresponding to questions A, E-H) in row 1 of dataset 110, the application may not be able to determine the additional set of data that needs to be collected from the user. This is because the row 1 in dataset 110 may not be a real representation of the data gathering requirements that indicate which questions are required, not-required, and covered for that user.

For example, by examining the first field of row 1, corresponding to question 1, the application may incorrectly deduce that question A may be a not-required question because the corresponding user did not answer it. In such an example, the application may not present question A to a future user whose available information matches some of the data fields of row 1. However, as described in relation to FIGS. 4-5, question A is, in fact, a covered question that was required to be presented but not answered by the previous users. In that case, the application is required to present question A to a future user, although answering it would not be required. The example above, illustrates that unless a dataset is reduced to a set of real representations of the data gathering requirements (e.g., dataset 150), the rows in the dataset may not be accurately used to determine the set of remaining information that needs to be collected from future users.

FIG. 7 illustrates an example set of real representations of the data gathering requirements. This set of real representations of the data gathering requirements may be used to drive user experience for future users by determining a set of information that needs to be collected for any user with any starting point in the data gathering process. For example, suppose an online tax preparation application has received or stores some information about a user that provides answers to questions D, E, F, G, and H, as follows: T, T, T, T, F. In such an example, the application matches the user's information with row 4 of dataset 150. As a result, the application may be able to determine that question A is required to be presented to and answered by the user while questions B and C are required to be presented to but not answered by the user. If row 4 had any data fields with null values, the application may have determined that the question was not required to even be presented to the user.

Figure 8:
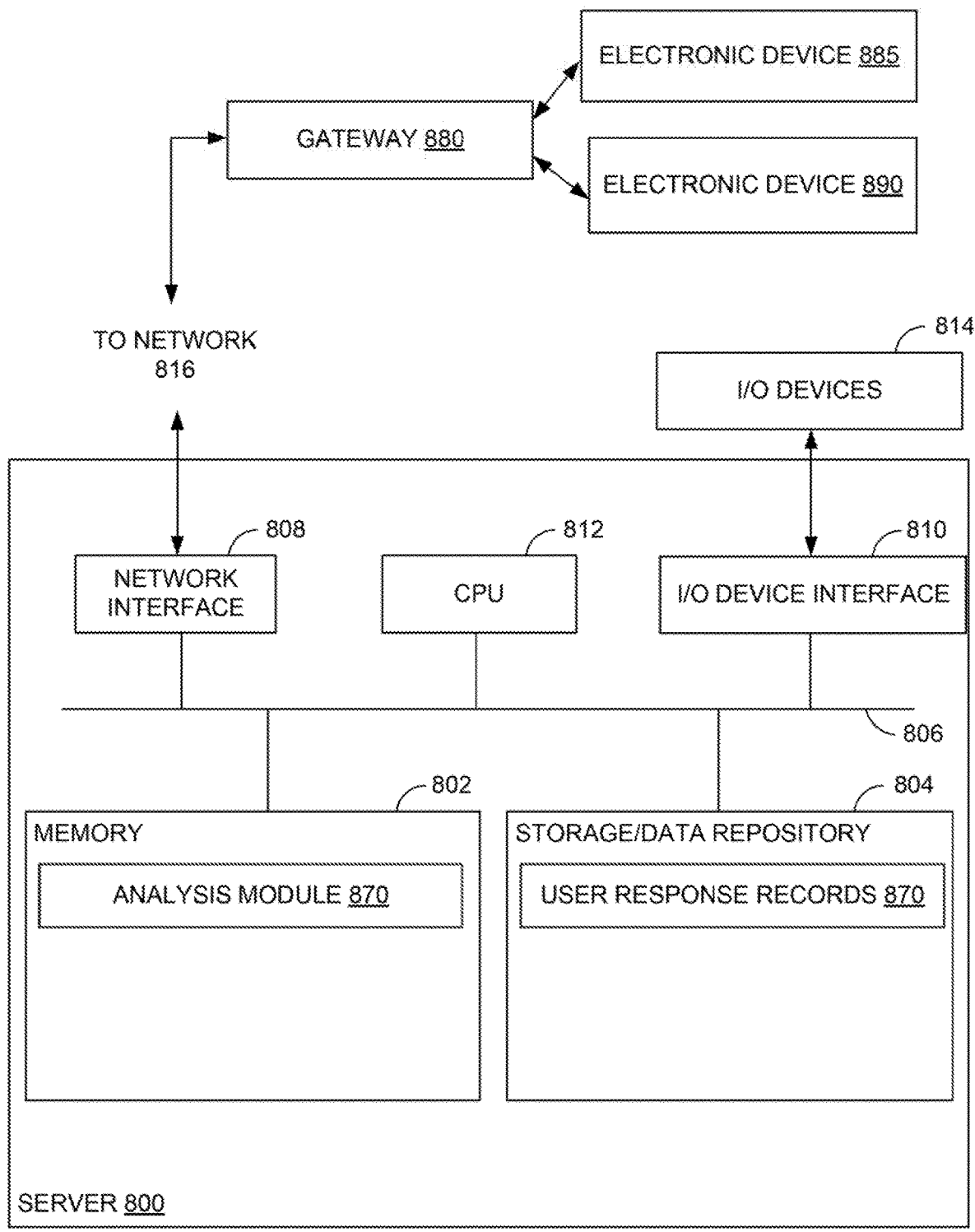
FIG. 8 illustrates an example server for determining that a user has been presented an element in a user interface, in accordance with certain embodiments.

FIG. 8 illustrates a server 800 that determines that a user has been presented an element in a user interface, as described in relation to FIGS. 1-7. As shown, server 800 includes, without limitation, a central processing unit (CPU) 812, at least one I/O device interface 810 which may allow for the connection of various I/O devices 814 (e.g., keyboards, displays, mouse devices, pen input, etc.) to server 800, network interface 808, a memory 802, storage 804, and an interconnect 806.

CPU 812 may retrieve and execute programming instructions stored in the memory 802. Similarly, CPU 812 may retrieve and store application data residing in memory 802.

Interconnect 806 transmits programming instructions and application data, among CPU 812, I/O device interface 810, network interface 808, memory 802, and storage 804. CPU 812 can represent a single CPU, multiple CPUs, a single CPU having multiple processing cores, and the like. Additionally, memory 802 represents random access memory. Furthermore, the storage 804 may be a disk drive. Although shown as a single unit, the storage 804 may be a combination of fixed or removable storage devices, such as fixed disc drives, removable memory cards or optical storage, network attached storage (NAS), or a storage area-network (SAN).

As shown, memory 802 includes an analysis module 870 for performing the methods described herein. In addition, storage 804 may correspond to the data repository 122 of FIGS. 1A-1B that stores user response records 870. User response records 870 may record user responses to questions presented to users for the purpose of gathering necessary information to complete a form. As described above, in some embodiments, only user responses of users who completed a compliant form (a form that meets the minimum requirements for being filed) are recorded in storage 804. An example of a repeating (non-de-duplicated) dataset was shown in FIG. 3 as dataset 110.

The foregoing description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method of determining that a user has been presented an element in a user interface, comprising:
presenting a user interface comprising a plurality of user interface elements to a plurality of users;
for each respective user of the plurality of users:
recording, in one or more fields of a data structure associated with the respective user, one or more user interactions with one or more of the plurality of user interface elements,
wherein the data structure includes a field for each user interface element of the plurality of user interface elements; and
for each respective data structure of a plurality of data structures:
deleting any data structure in the plurality of data structures that is identical to the respective data structure to form a non-repeating set of data structures;
determining that a user interface element of the plurality of user interface elements was presented to a set of users of the plurality of users by:
identifying a first data structure and a second data structure in the non-repeating set of data structures, wherein a Hamming distance between the first data structure and the second data structure is 1;
comparing the first data structure to the second data structure by:
identifying a first field in the first data structure that is associated with a user interaction; and
identifying a second field in the second data structure that is not associated with a user interaction, wherein the first field corresponds to the second field; and
generating a third data structure based on the comparing the first data structure to the second data structure wherein:
a third field in the third data structure corresponds to the first field and the second field, and
a set of remaining fields in the third data structure matches a first corresponding set of remaining fields in the first data structure and a second corresponding set of remaining fields in the second data structure; and
identifying the user interface element as a covered user interface element based on the third field in the third data structure.

2. The method of claim 1, further comprising marking the first data structure and the second data structure for deletion.

3. The method of claim 1, wherein a Hamming distance between the third data structure and each of the first data structure and the second data structure is 1.

4. The method of claim 1, wherein the user interface element presented to the set of users did not require any user interaction.

5. The method of claim 1, further comprising:
for each respective data structure of the plurality of data structures, prior to deleting any data structure:
determining a number of data structures N in the plurality of data structures that are identical to the respective data structure; and
storing N+1 in a field of the respective data structure.

6. The method of claim 5, wherein a first number of data structures $N_1$ associated with the first data structure divided by a second number of data structures $N_2$ associated with the second data structure is less than a threshold.

7. A method of determining that a user has been presented an element in a user interface, comprising:
obtaining a dataset having a plurality of data structures, wherein each data structure comprises one or more fields storing one or more user interactions of a user of a plurality of users with one or more of a plurality of user interface elements of a user interface presented to the user, wherein each data structure includes a field for each user interface element of the plurality of user interface elements; and for each respective data structure of a plurality of data structures:
  deleting any data structure in the plurality of data structures that is identical to the respective data structure to form a non-repeating set of data structures; and
determining that a user interface element of the plurality of user interface elements was presented to a set of users of the plurality of users by:
  identifying a first data structure and a second data structure in the non-repeating set of data structures, wherein a Hamming distance between the first data structure and the second data structure is 1;
  comparing the first data structure to the second data structure by:
    identifying a first field in the first data structure that is associated with a user interaction; and
    identifying a second field in the second data structure that is not associated with a user interaction, wherein the first field corresponds to the second field; and
  generating a third data structure based on the comparing the first data structure to the second data structure, wherein:
    a third field in the third data structure corresponds to the first field and the second field, and
    a set of remaining fields in the third data structure matches a first corresponding set of remaining fields in the first data structure and a second corresponding set of remaining fields in the second data structure; and
  identifying the user interface element as a covered user interface element based on the third field in the third data structure.

8. A computer system, comprising:
a non-transitory memory comprising executable instructions; and
a processor configured to execute the instructions to cause the computer system to:
  obtain a dataset having a plurality of data structures, wherein each data structure comprises one or more fields storing one or more user interactions of a user of a plurality of users with one or more of a plurality of user interface elements of a user interface presented to the user, wherein each data structure includes a field for each user interface element of the plurality of user interface elements; and
  for each respective data structure of a plurality of data structures:
    delete any data structure in the plurality of data structures that is identical to the respective data structure to form a non-repeating set of data structures;
  determine that a user interface element of the plurality of user interface elements was presented to a set of users of the plurality of users by:
    identifying a first data structure and a second data structure in the non-repeating set of data structures, wherein a Hamming distance between the first-data-structure and the second data structure is 1;
    comparing the first data structure to the second data structure by:
      identifying a first field in the first data structure that is associated with a user interaction; and
      identifying a second field in the second data structure that is not associated with a user interaction, wherein the first field corresponds to the second field; and
    generating a third data structure based on the comparing the first data structure to the second data structure, wherein:
      a third field in the third data structure corresponds to the first field and the second field, and
      a set of remaining fields in the third data structure matches a first corresponding set of remaining fields in the first data structure and a second corresponding set of remaining fields in the second data structure; and
    identifying the user interface element as a covered user interface element based on the third field in the third data structure.

9. The computer system of claim 8, wherein the processor is further configured to mark the first data structure and the second data structure for deletion.

10. The computer system of claim 8, wherein a Hamming distance between the third data structure and each of the first data structure and the second data structure is 1.

11. The computer system of claim 8, wherein the user interface element presented to the set of users did not require user interaction.

12. The computer system of claim 8, wherein the processor is further configured to:
  for each respective data structure of the plurality of data structures, prior to deleting any data structure:
    determine a number of data structures N in the plurality of data structures that are identical to the respective data structure; and
    store N+1 in a field of the respective data structure.

13. The computer system of claim 12, wherein a first number of data structures $N_1$ associated with the first data structure divided by a second number of data structures $N_2$ associated with the second data structure is less than a threshold.

14. The method of claim 7, further comprising marking the first data structure and the second data structure for deletion.

15. The method of claim 14, further comprising:
  identifying a plurality of data structures, including the first data structure and the second data structure, that are marked for deletion; and
  deleting the plurality of data structures.

16. The method of claim 7, wherein a Hamming distance between the third data structure and each of the first data structure and the second data structure is 1.

17. The method of claim 7, wherein the user interface element presented to the set of users did not require a-y user interaction.

18. The method of claim 7, further comprising:
  for each respective data structure of the plurality of data structures, prior to deleting any data structure:
    determining a number of data structures N in the plurality of data structures that are identical to the respective data structure; and
    storing N+1 in a field of the respective data structure.

19. The method of claim 17, wherein a first number of data structures $N_1$ associated with the first data structure divided by a second number of data structures $N_2$ associated with the second data structure is less than a threshold.

20. The method of claim 2, further comprising:
  identifying a plurality of data structures, including the first data structure and the second data structure, that are marked for deletion; and
  deleting the plurality of data structures.

* * * * *